United States Patent [19]

Flamm

[11] Patent Number: 5,146,329
[45] Date of Patent: Sep. 8, 1992

[54] APPARATUS AND METHOD FOR REDUCING LINE FLICKER IN A TELEVISION PICTURE

[75] Inventor: Peter M. Flamm, March-Buchheim, Fed. Rep. of Germany

[73] Assignee: Deutsche ITT Industries GmbH, Freiburg, Fed. Rep. of Germany

[21] Appl. No.: 662,647

[22] Filed: Mar. 1, 1991

[30] Foreign Application Priority Data

Mar. 9, 1990 [EP] European Pat. Off. ........ 90104483.4

[51] Int. Cl.$^5$ .............................................. H04N 5/21
[52] U.S. Cl. ...................... 358/166; 358/11; 358/140
[58] Field of Search ............... 358/166, 167, 140, 141, 358/11, 36, 37

[56] References Cited

U.S. PATENT DOCUMENTS

| 4,300,162 | 11/1981 | Roberts | 358/160 |
| 4,680,632 | 7/1987 | Willis et al. | 358/166 |
| 4,740,842 | 4/1988 | Annegarn et al. | 358/167 |
| 4,947,251 | 8/1991 | Hentschel | 358/166 |

FOREIGN PATENT DOCUMENTS 0305017  8/1988  European Pat. Off. .
0318760  11/1988  European Pat. Off. .

OTHER PUBLICATIONS

Scanning Modes for Flicker-Free Colour TV-Reproduction; H. Schroder, et al., IEEE Transactions on Consumer Electronics, vol. CE-34, No. 4, Nov. 1985.

Flimmerreduktionsverfahren zur Verbesserung der Fernseh-Bildwiedergabe; Ch. Hentschel; ntzArchiv Bd. 7, H. 9; 1985; pp. 219–229.

Vermeidung des Grossflachenflimmerns in Fernseh-Heimempfangern; Von Uwe E. Kraus; Rundfunktech Mitteilungen; Jarg. 25; 1981; pp. 264–269.

Primary Examiner—James J. Groody
Assistant Examiner—Glenton B. Burgess
Attorney, Agent, or Firm—Thomas L. Peterson

[57] ABSTRACT

Line flicker is detected by comparing luminance values provided by a video signal in vertically successive lines of two temporally successive fields. If there is a step change in adjacent lines, indicative of line flicker, the line flicker is corrected by adaptively delaying or accelerating corresponding lines within the field that experienced the step change.

18 Claims, 13 Drawing Sheets

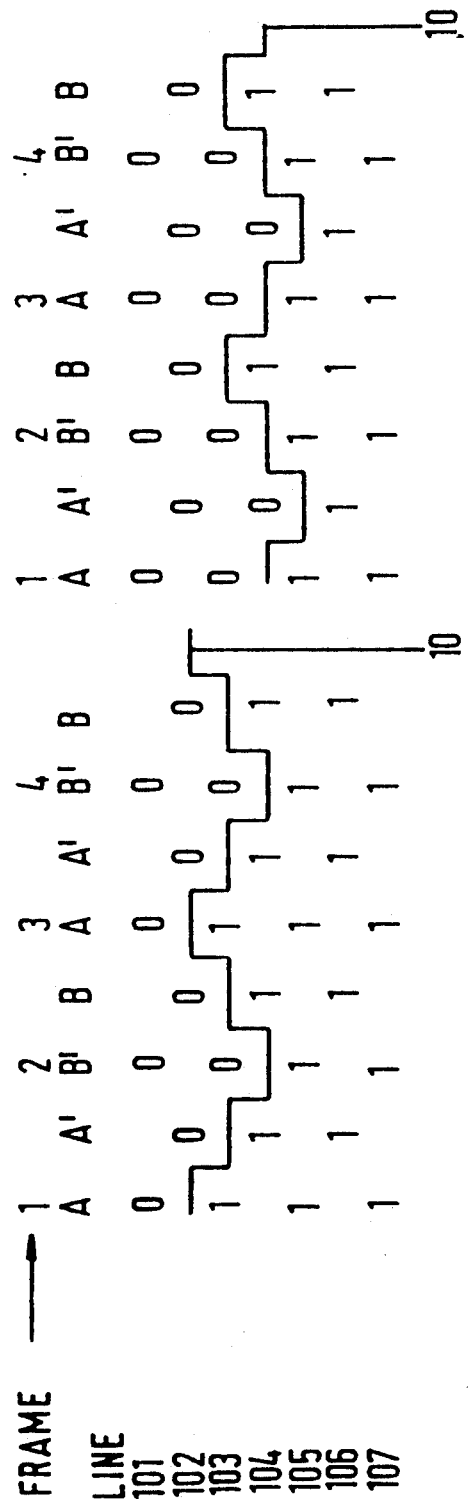

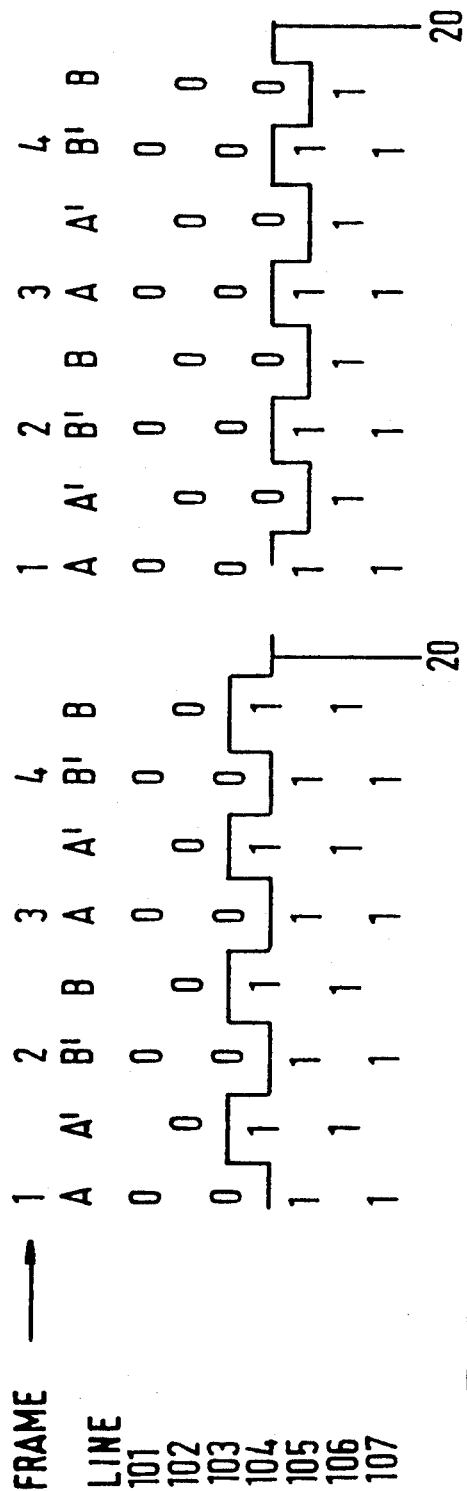

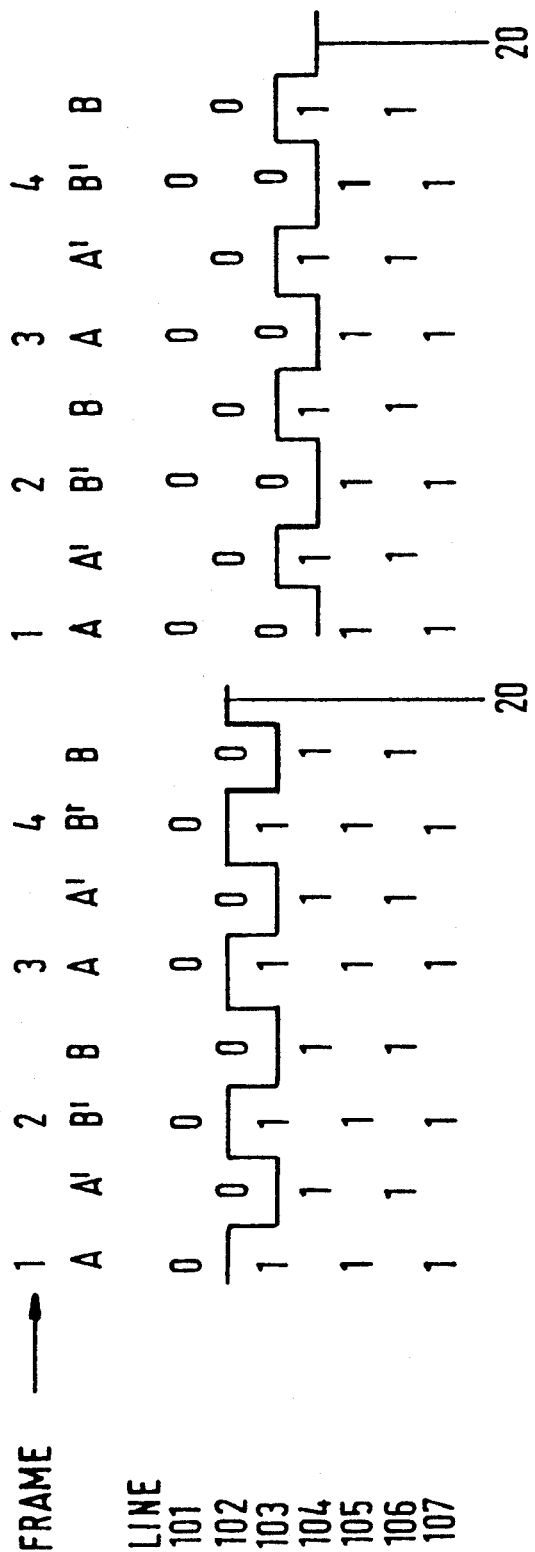

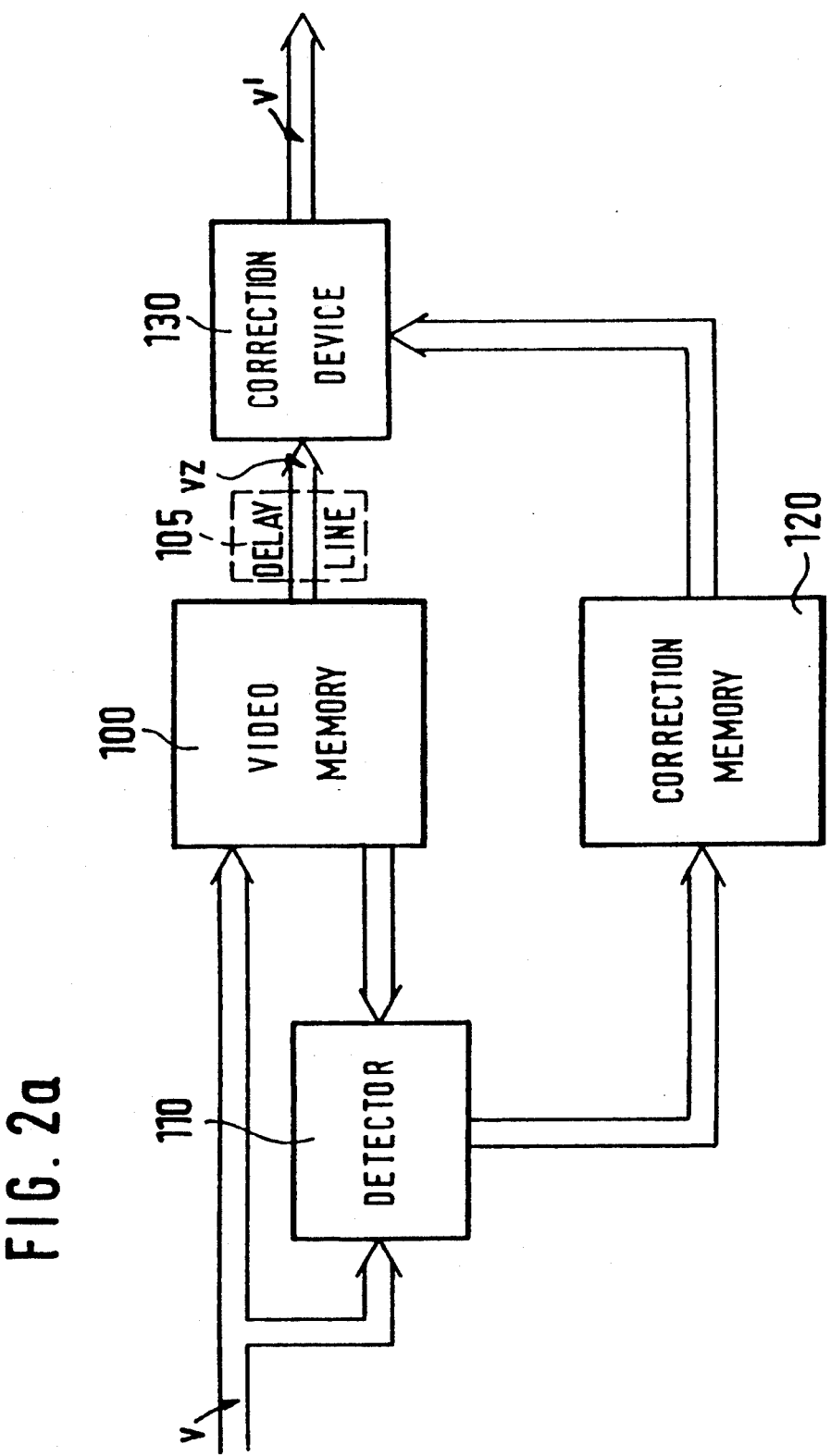

| ROW 1 | 1A | 1B | 2A | 2B | 3A | 3B | | |
|---|---|---|---|---|---|---|---|---|
| ROW 2 | | 1A | 1B | 2A | 2B | 3A | 3B | |
| ROW 3 | | 1A | 1B | 2A | 2B | 3A | 3B | |
| ROW 4 | 1A | 1B' | 2A | 2B' | 3A | 3B' | | |
| ROW 5 | 1A' | 1B | 2A' | 2B | 3A' | 3B | | |

APPARATUS AND METHOD FOR REDUCING LINE FLICKER IN A TELEVISION PICTURE

BACKGROUND OF THE INVENTION

The present invention relates to apparatus and methods for reducing line flicker in a television picture. More specifically, for a picture that is reproduced by 100 Hz interlaced scanning, the apparatus and method detects line flicker by comparing vertically successive lines of two temporally successive fields, and corrects line flicker by adaptively delaying or adaptively accelerating corresponding lines within the same field. The term "line flicker" has sometimes been referred to as "edge flicker" and so on.

By convention, television pictures are transmitted to a receiver and reproduced on a screen in accordance with an interlace principle, in which each picture frame is divided into two fields. A first field contains the even-numbered lines of the frame and the second field contains the odd-numbered lines. The two fields are reproduced in an alternating manner by a fast, successive scan of the respective lines. On the European system the fields are transmitted at a rate of 50 Hertz, which results in the frame being reproduced on the screen at a rate of 25 Hz.

In the reproduction of still and slow-motion pictures with sharp dark/light transition areas, visible line jumps may be observed. In the two fields, the transition line between the white/black (light/dark) areas can be reproduced with a mutual spacing of one line. This phenomenon, caused by the alternating reproduction of the two fields, is known as flicker. Occurring at a rate of 25 Hz, the flicker has unpleasant effect on the eye of an observer.

Several methods have been proposed for reducing flicker in an interlaced television picture. For instance, see an article by Schroder et al. entitled "Scanning Modes for Flicker-Free Colour TV Reproduction" in IEEE Transactions on Consumer Electronics, Vol. CE-31, No. 3, pp 627–641 (1985). Three methods are proposed: (1) Motion Adaptive Frame Repeition; (2) Motion Adaptive Progressive Scan Reproduction with Temporal Field Interpolation; and (3) Motion Adaptive Progressive Scan Reproduction with Field Insertion. These three methods reduce line flicker by repeating the fields of the interlaced signal at a 100 Hz rate, which is twice the normal frequency. In 100 Hz interlaced scanning, the temporal field sequence of each frame consists of a primary first field A, secondary first field A', secondary second field B', primary second field B. In method (1), still and slowly moving pictures are reproduced by repeating the fields of a frame in a sequence AB AB. For faster moving areas each field is repeated directly or, where necessary, in a vertically interpolated version. In method (2), a frame is obtained from the incoming interlaced signal by combining the actual field and the temporal mean value of the adjacent fields. In method (3), a frame is obtained from simple addition of two adjacent fields.

Although the reproduction of the fields at a rate of 100 Hz does, in fact, reduce large-area flicker, it does not eliminate or reduce line flicker, which still occurs at a rate of 25 Hz. In the HDTV receiver, the 100 Hz interlaced scanning results in line flicker having an amplitude of two lines, which degrades resolution of the television picture.

See European Patent Application 0 305 017 filed on Aug. 8, 1988 and entitled "A television receiver having means for the suppression of line flicker." A detector detects the distribution of intensity of the video signal in an area vertically above and below the picture spot, and provides a correction signal whenever a significant difference in intensity is detected. This correction signal controls a control unit such that in one or both of the half pictures the line under reproduction will be displaced to such an extent that the transition line in both of the half pictures is reproduced at the same vertical location on the screen.

Another method is described in an article by U. Kraus and entitled "Vermeidung des GroBflächenflimmerns in Fernseh-Heimempfängern" in Rundfunktechnische Mitteilungen 25, H.7, pp. 264–69 (1981). A single repetition of two fields is used to reproduce a frame. The first field of an interlaced signal is reproduced on the screen twice in succession at a rate of 100 Hz. Then, the second field is written on the screen twice. By this method, line flicker is increased to 50 Hz, such that the human eye cannot perceive it. However, such a repetition of the two fields of a frame results in a false assignment of the phase of motion. This causes motion to blur, which drastically reduces the resolution of the television picture. While this method works fairly well for the reproduction of still pictures, it is not well-suited for displaying details in moving pictures.

Yet another method is disclosed in an article by C. Hentschel and entitled "Flimmerruduktionsverfahren zur Verbesserung der Fernseh-Bildwiedergabe" in ntz-Archiv 7, pp. 219–229 (1985). In this motion-adaptive method, first and second fields of a frame are temporarily stored in memory. A motion detector is provided to detect motion in one or more subareas of the first field and in corresponding subareas of the second field. From the temporal and/or vertical changes in subareas of the picture, interpolation coefficients are calculated by means of which a weighted superposition of associated lines of the first and second fields is effected. One disadvantage of this method is that vertical resolution of the television picture is reduced due to the weighted mixture of corresponding lines of the first and second fields. The mixing of the two successive fields, results in motion blur of the television picture. Furthermore, apparatus for implementing this method is extremely complicated and expensive. Since the purchase price of a home receiver equipped with such apparatus would be prohibitive, this method is not suitable for use in home receivers.

Therefore, it is an object of the present invention to reduce line flicker caused by 100 Hz interlaced scanning in a simple and inexpensive manner.

It is a further object of the present invention to ensure that vertical resolution of the television picture is not impaired and that large-area flicker is nor produced.

SUMMARY OF THE INVENTION

Line flicker is corrected by signal-adaptive delay or signal-adaptive acceleration of corresponding lines (or their contents) within a single field. A television picture is reproduced from a plurality of frames that are supplied by an interlaced video signal. Each frame in the video signal consists of a first field, which contains all odd-numbered lines of the frame, and a second field, which contains all even-numbered lines of the frame. Each line contains luminance values. The first and second fields are transmitted to the television via the video signal at a given repetition rate, and the first and second fields are reproduced on a television screen at twice the given repetition rate in a vertically-temporal scanning sequence consisting of a primary first field, secondary first field, secondary second field and primary second field. The method and apparatus determines whether a step change in luminance value occurs between a line of a field and a vertically-following line in a temporally-following field; converts the step change to a correction factor; and applies the correction factor to the video signal when one of the fields in said scanning sequence is reproduced. As a result, a line of either the first field or the second field is signal-adaptively corrected in the field being reproduced. This method and apparatus prevents motion blur without impairing the vertical resolution of the television picture.

BRIEF DESCRIPTION OF THE FIGURES

FIGS. 1a-1b are graphic representations of a frame that was reproduced by an interlaced-scanning technique for flicker reduction according to the prior art;

FIGS. 1c-1f are graphic representations of a frame that was reproduced by a method of reducing flicker in accordance with the present invention;

FIG. 2a is a block diagram of apparatus for removing line flicker from a television receiver in accordance with a first embodiment of the present invention;

FIG. 2b is a timing diagram of the apparatus illustrated in FIG. 2a;

FIG. 3b is a timing diagram of the apparatus illustrated in FIG. 3a;

FIG. 4b is a timing diagram of the apparatus illustrated in FIG. 4a;

FIG. 6 is a block diagram of an alternate embodiment of the detector 110, which embodiment is especially suited for use in the apparatus illustrated in FIG. 4a.

DETAILED DESCRIPTION OF THE FIGURES

Figure 2B:
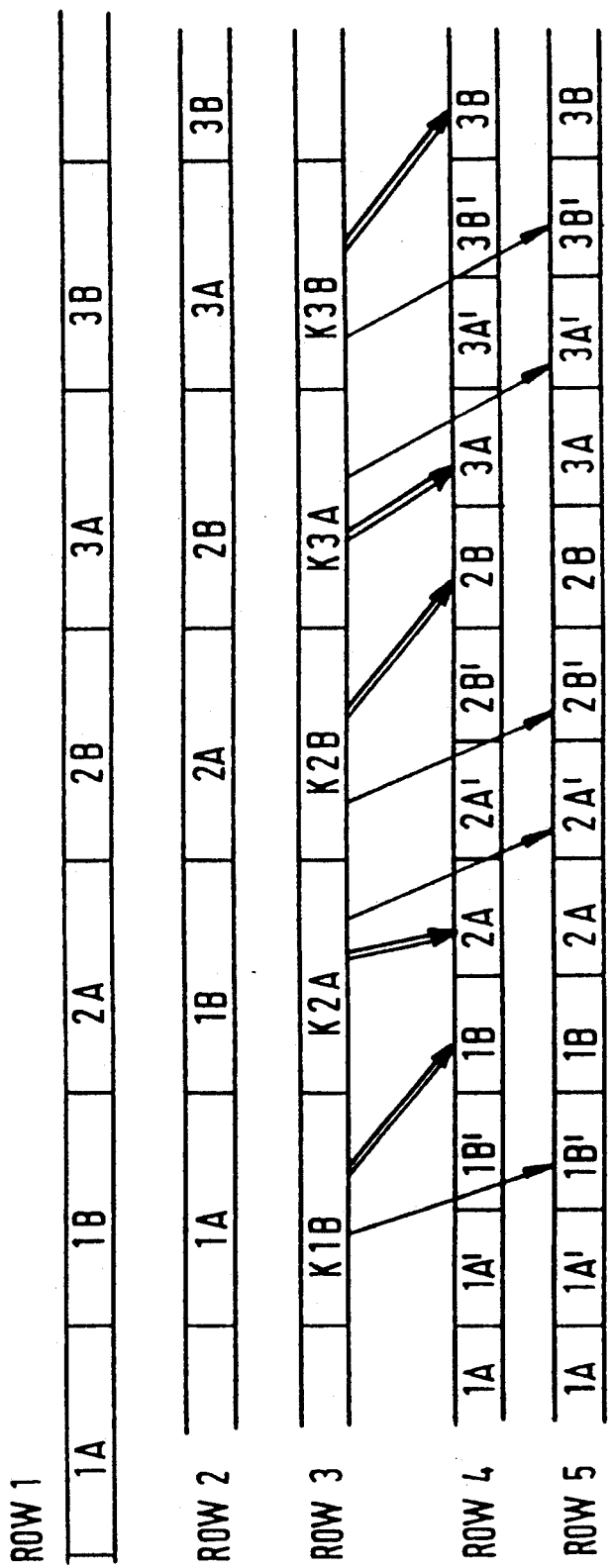

With reference to FIGS. 1a-1f, a method of reducing flicker during picture reproduction is explained. The method is described in conjunction with a simple television picture. It is assumed that this simple television picture contains only two monochromatic areas: a white area and a black area. The luminance of the white area is assigned an amplitude value of "0" (i.e., small amplitude value), and the luminance of the black area is assigned an amplitude value of "1" (i.e., large amplitude value). At the horizontal transition line between the white and black areas, there is a large difference in contrast, which manifests itself as line or edge flicker. Although this assumption is extremely simple, it permits an explanation of all essential details of the method and does not limit the generally of the following considerations.

FIGS. 1a-1f show how a frame consisting of first and second fields A and B is reproduced in a receiver. In a video frame of 625 lines, the first scanning pattern, first field A, contains the odd lines (lines 1, 3 . . . 101, 103, 105 . . . 625) and the second scanning pattern, second field B, contains the even lines (lines 2, 4 . . . 102, 104, 106 . . . 624). In FIGS. 1a-1f, lines 101 to 107 are shown. The progression of lines is shown in a vertical direction.

A double-mode scan pattern is employed for flicker reduction. In this interlaced scanning pattern, the well known field sequence of A, A', B', B is used. The first field A is written in a first raster as a primary first field A. Then, the first field A is reproduced in the second raster of the second field B as a secondary first field A'. The second field B, which follows the first field A, is then written in the first raster of the field A as a secondary second field B', and then in the second raster as a primary second field B. Thus, in a double-mode scan pattern, field A is referred to as the primary first field, field A' as the secondary first field, field B' as the secondary second field and field B as the primary second field. The fields A, A', B' and B are provided at a 100 Hz rate such that each field A, A', B' and B can be reproduced in 10 milliseconds. Thus, the reproduction of a frame, which consists of a complete field sequence A, A', B', B, requires 40 milliseconds. As a result, the frames are output at a rate of 25 Hz. In FIGS. 1a-1f, these temporal sequences are shown in the horizontal direction.

Because each frame consists of two interleaved fields A and B, there can be a step change in luminance between two vertically and temporally successive lines. This step change causes the line flicker in a television picture. The step change can occur in two possible ways. One way is shown in FIGS. 1a, 1c and 1e, where the signal step change first occurs in the first field A. The amplitude of the luminance signal increases from line 102 of the second field B to the next vertical line (line 103) of the temporally following field (first field A). The other way is shown in FIGS. 1b, 1d and 1f, where a signal step change first occurs in the second field B. The amplitude of the luminance signal increases from line 103 of the first field A to the next vertical line (line 104) of the temporally following field (second field B).

Referring first to FIGS. 1a through 1b, there is shown schematic representations of a frame that was reproduced by an interlaced-scanning technique for flicker reduction according to the prior art. A transition line 10 is shown between the black area (designated by "1") and the white area (designated by "0"). It can be seen that the transition line 10 flickers at a frequency of 25 Hz, which flicker is irritating to the human eye. The period of the line flicker is 40 milliseconds because the time required for one complete field sequence A, A', B', B (i.e. one frame) is 40 milliseconds. The amplitude of the line flicker and the resulting line crawl amount to two lines, whereby the vertical resolution of the television picture is impaired.

In the method according to the present invention, line flicker is reduced by comparing the luminance signal of one line of a field with the luminance signal of the next line of the next field. This comparison determines whether the aforementioned step change occurs. A difference signal is derived from this comparison. The magnitude and phase of the difference signal is directly proportional to the amplitude of the step change. The amplitude indicates the difference in contrast between adjacent lines of temporally successive fields. In the simplified case of a television picture having monochromatic areas, the step change is either 0 or 1. The phase indicates whether the step occurred in the first field A (see FIGS. 1a and 1e) or whether the step occurred in the second field B (see FIGS. 1d and 1f). The determination of the phase is particularly important if the contrast transition extends over several lines, i.e., if there is a continuous transition rather than a step change (see FIGS. 1a-1f). The phase may indicate that the transition (50% limit) lies between two lines. The difference signals are converted to correction factors, which factors are used to correct the field in which the step occurs.

If the step change occurs in the first field A, the primary first field A can be delayed by up to one line in the vertical direction, and if the step change occurs in the second field B, the second field B is delayed by up to one line in the vertical direction (see FIGS. 1c and 1d). Alternately, if the step change occurs in the first field A, the temporally following secondary second field B' is accelerated by up to one line, and if the step change occurs in the second field B, the temporally following secondary first field is accelerated by up to one line (see FIGS. 1e and 1f). During acceleration, the secondary field is displayed up to one line earlier than in a normal field sequence A, A', B', B. The signal-adaptive delay or signal-adaptive acceleration of the corresponding field is chosen in accordance with the correction factor, which is derived from the step amplitude.

Referring now to FIGS. 1c-1f, there is shown schematic representations of a frame that was reproduced by the method according to the present invention. A transition line 20 is shown between the black area (designated by "1") and the white area (designated by "0"). The effect of signal-adaptive delay of the primary first field A is shown in FIG. 1c. A comparison of the first and fifth columns in FIGS. 1a and 1c reveals that flicker is reduced due to the delay in the first field A by one complete line during the reproduction of these fields as the primary field A of the vertical-temporal scanning pattern. A comparison of the fourth and eighth columns of FIGS. 1b and 1d reveals similar results for a delay of the primary second field B in response to a step change in the second field B. In both FIGS. 1c and 1d, the delay is made in accordance with the above assumptions of maximum possible step change in the luminance signal (i.e., a change from white to black). Note that the vertical resolution is not impaired since adjacent lines of two successive fields are not combined.

The effect of signal-adaptive acceleration of the secondary field, which secondary field follows the field in which the step change occurred, is shown in FIGS. 1d and 1f. A comparison of the third and seventh columns in FIGS. 1a and 1e (signal step change in field A) reveals that flicker is reduced due to the acceleration of the second field B as the secondary second field B'. A comparison of the second and sixth columns in FIGS. 1b and 1f (signal step change in field B) reveals that flicker is reduced due to the acceleration of the first field A as the secondary first field A'.

Thus, it can be seen that the transition line 20 flickers at a frequency of 50 Hz. Because of the geometrical-temporal interation filtering effect of the human eye, a viewer cannot perceive this slight picture disturbance. Thus, flicker is reduced. Further, vertical resolution is improved since the amplitude of the flicker is one line.

Referring now to FIG. 2a, there is shown a first embodiment of apparatus for removing line flicker from a television receiver in accordance with the present invention. The apparatus receives a digital video signal from a tuner of a television receiver. The video signal, which contains first and second fields A and B of a frame in a time-division multiplexed, serial form, has already been converted from an analog signal to the digital signal by an analog-to-digital converter (not shown). Further, the digital signal has already been processed in a conventional manner by image-processing devices (not shown) in the television receiver. These image processing devices are well known to those skilled in the art. The digital video signal is supplied to an input of a video memory 100 via a data bus v. The data bus is well known to those skilled in the art, and the video memory 100 can be a random access memory (RAM). The video memory 100 stores the video signal. As a field A or B is being read into video memory 100, the preceding field A or B is read out on data bus vz at a field rate of 100 Hz. Thus, the video memory 100 also functions to delay the output of the video signal by one field. One can ascertain from FIG. 2b that the video memory 100 also outputs the video signal in a vertical-temporal scanning pattern having the field sequence A, A', B', B.

The data bus v is also coupled to a first input of the detector 110. A second output of the video memory 100 is coupled to a second input of the detector 110. The second output of the video memory 100 outputs a field with a delay time of one field. Thus, the second field B of the first frame, which follows the first field A of the first frame, is simultaneously applied to the video memory 100 and to the first input of the detector 110. The first field A of the first frame delayed by one field period from memory 100 is applied to the second input of the detector 110. The detector 110 determines the step amplitude by calculating the difference in luminance between one line of the first field A of the previous field and the next successive line, which is in the second field B. Detection is repeated in a line-by-line comparison of luminance values for temporally successive fields.

The difference signals provided by the detector 110 are converted to correction values by a correction memory 120, which can be a lookup table. The video memory 100 and the correction memory 120 can be realized as independent memory devices or they can be realized by a single memory device.

The correction values provided by the correction memory 120 are supplied to a first input of a correction device 130. The output of the video memory 100, which has the field sequence A, A', B', B, is supplied to a second input of the correction device 130 via the data bus vz. The correction device 130 performs a linear interpolation of the brightness values of two vertically adjacent pixels within a field. Depending on the weighting function utilized by the correction device 130 (see FIG. 8, for instance), the pixel values can be either delayed or accelerated. The correction device 130 outputs a corrected video signal v', with suppressed large-area and line flicker. The functions of the correction device can also be implemented directly by a memory and processor where a corrected video signal can be obtained.

It should be noted the correction device 130 cannot accelerate a field in real time. According to the present invention, however, acceleration is achieved by delaying the preceding primary and secondary fields and reproducing the secondary second field unchanged. Those skilled in the art should know how to implement such acceleration. For example, the correction device 130 could delay or accelerate data on the data bus vz by controlling the delay of a variable delay line 105, (shown by dashed lines) which delay line 105 is connected between the video memory 100 and the correction device 130. If no step change occurs, the video signal is delay by exactly one line. If the video signal is to be accelerated, the delay is cancelled, and if the video signal is to be delayed, the delay is increased by an additional line.

The above-described terms signal-adaptive delay, signal-adaptive acceleration, lines and line contents are derived from the appearance of the horizontal contrast transitions that causes annoying line flicker. In reality, the correction is performed pixel by pixel. The brightness value of each pixel being is corrected in accordance with the stored correction value, which stored correction value is a function of the adjacent upper or lower pixel in the same field. Via the correction device 130, which is supplied by the Correction Memory 120 with the correction values, arbitrary intermediate values can be formed. Therefore, the correction values stored in the correction memory 120 are related directly to the individual pixels, and not to lines or fields. However, for simplicity, the correction is described in terms of lines.

Referring additionally to FIG. 2b, the operation of the apparatus illustrated in FIG. 2a (i.e., the correction of two fields of successive video frames) is shown by a timing diagram. As previously mentioned, the video signal contains the first and second fields A and B of each frame in a time-division multiplexed, serial form. Thus ROW 1 of FIG. 2b shows the temporal succession of the first and second fields 1A and 1B of the first frame, the first and second fields 2A and 2B of the second frame and the first and second fields 3A and 3B of the third frame as they are applied to the input of the video memory 100. The fields are input to the video memory 100 at a rate of 50 Hz. Therefore, each field has a duration of 20 ms.

ROW 2 shows the temporal succession of the fields 1A, 1B, 2A, 2B, 3A and 3B as they are supplied to the second input of the detector 110. It is apparent that the output of the video memory 100 is delayed by one field. The fields are supplied to the second input of the detector 110 at a rate of 50 Hz.

ROW 3 shows the temporal succession of correction values K1B, K2A, K2B, K3A and K3B that are derived from the detector 110/Correction Memory 120 for the corresponding rows 1B, 2A, 2B, 3A and 3B. The detector 110 compares the second field B of the first frame with the first field A of the first frame and determines whether a step change occurs from the first field A to the second field B. This comparison is performed for all temporally successive fields. The correction values K1B, K2A, K2B, K3A and K3B are applied to the first input of the correct device 130 at a rate of 50 Hz.

ROW 4 shows the correction of line flicker on the temporally-following field by signal-adaptive delay. If the correction values derived in the detector 110 indicate a step change in both phase and magnitude, the second field 1B is displayed with a signal-adaptive delay. If the comparison between the two fields 1A and 1B indicates that a step change occurred not in the second field 1B but in the preceding first field 1A, the temporal correction will be performed as a delay in the first field 1A, and the second field will be displayed unchanged. The double arrows indicate the primary fields 1B, 2A, 2B, 3A and 3B on which the signal-adaptive delays are performed. The fields A, A', B' B are outputted by the correction device 130 at a rate of 100 Hz. Therefore, each field A, A', B' and B has a duration of 10 ms.

ROW 5 shows the correction of line flicker on the temporally-following field by signal-adaptive acceleration. If the detector 110 detects a signal step change from the first field A to the second field B, the correction device 130 effectuates a signal-adaptive acceleration on the secondary second field B'. Similarly, if the detector 110 detects a signal step change from the second field B to the first field A of the next frame, the correction device 130 effectuates a signal-adaptive acceleration on the secondary first field A'. The signal arrows indicate the secondary fields 1B', 2A', 2B', 3A' and 3B' on which the signal-adaptive accelerations are performed. The fields A, A', B' and B are outputted by the correction device 130 at a rate of 100 Hz. Therefore, each field A, A', B' and B has a duration of 10 ms.

Figure 5:
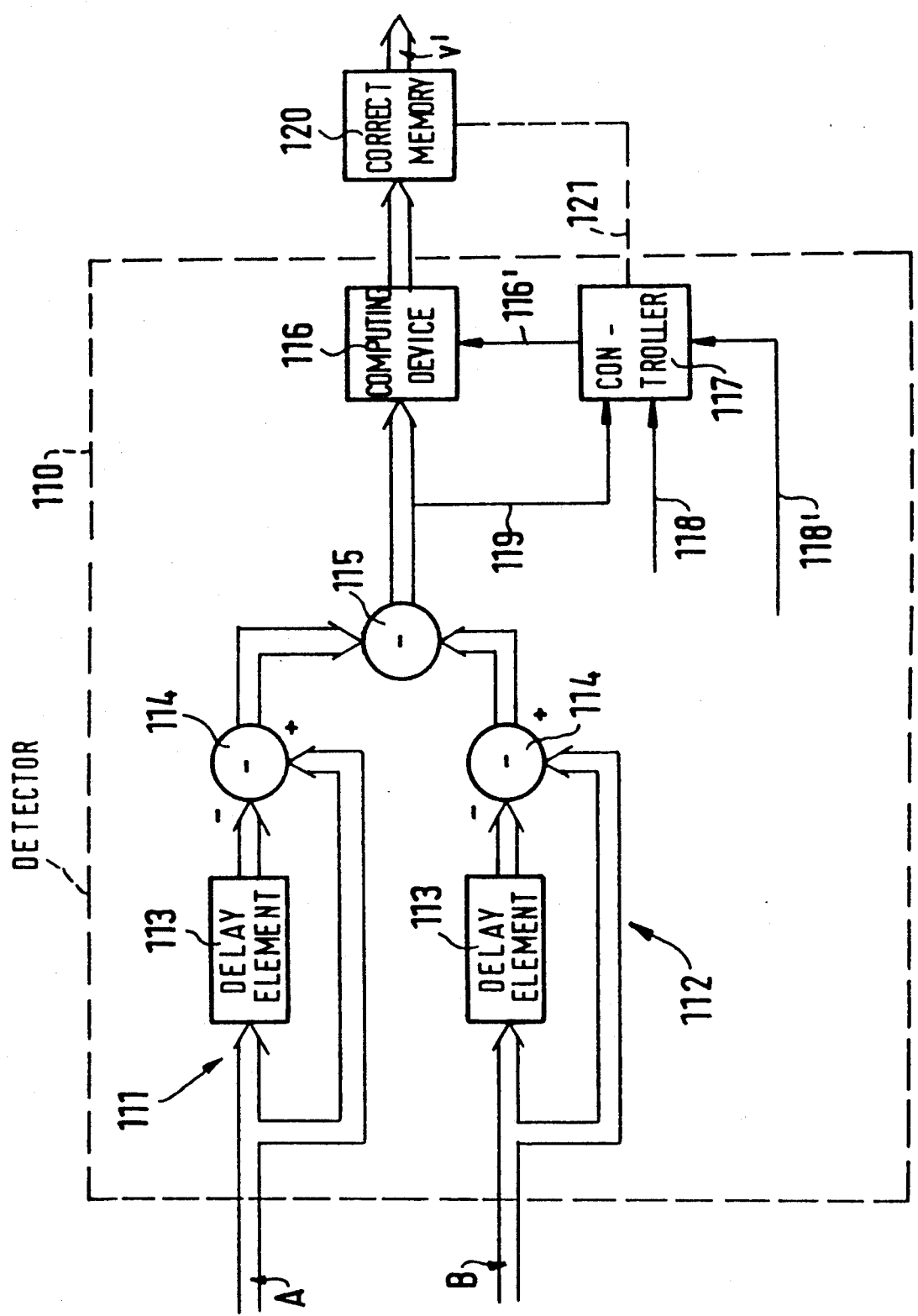
FIG. 5 is a block diagram of a first embodiment of the detector, which forms a part of the apparatus illustrated in FIG. 1.

Referring now to FIG. 5, there is shown a block diagram of a first embodiment of the detector 110, which forms a part of the apparatus illustrated in FIG. 1. The detector 110 includes a first differentiator 111, whose input receives the current pixel values from data bus v, a second differentiator 112, whose input receives pixel values from the video memory 110, a subtractor 115, a computing device 116 and a controller 117. Both differentiators 111 and 112 include a delay element 113, which delays the respective input thereto by one line, and a subtractor 114, which subtracts the respective input from the output of the respective delay line. Thus, the first differentiator 111 provides an output signal equal to the difference in luminance of vertically adjacent pixels in the current field, and the second differentiator 112 provides an output signal equal to the difference in luminance of vertically adjacent pixels in the previous field, which previous field is provided by the video memory 100.

The outputs of the first and second differentiators 111 and 112 are coupled to respective inputs of the subtractor 115, whose output signal provides a comparison of the luminance signal of a line of a current field with that of the corresponding line of a temporally preceding field. The output signal provided by the subtractor represents the difference signal, which is essential for the detection of a step change.

The difference signal, provided by the subtractor 115, is supplied to an input of the computing device 116, which inverts the input signal, if necessary. The inversion is dependent on the respective phase of the field A, A', B' or B. The output of the computing device, which provides the output of the detector 110, is coupled to an input of the correction memory.

The computing device 116 and Correction Memory 120 are controlled by the controller 117 in accordance with signals provided to the controller 117 over first, second and third control lines 118, 118' and 119. A control signal is applied to the controller over the third signal line 119. This control signal is derived from the sign bit of the difference signal, such that the control signal indicates the phase of the difference signal. Via the first and second control lines 118 and 118', the controller 117 receives additional control signals from the central control unit (not shown) of the television receiver. These additional signals contain information on the fields (i.e. primary first and second fields or primary second and first fields) presented to the first and second differentiators 111 and 112. The controller 117 controls the computing device 116 over control line 116'. The controller controls the Correction Memory 120 over the control line 121.

Figure 7:
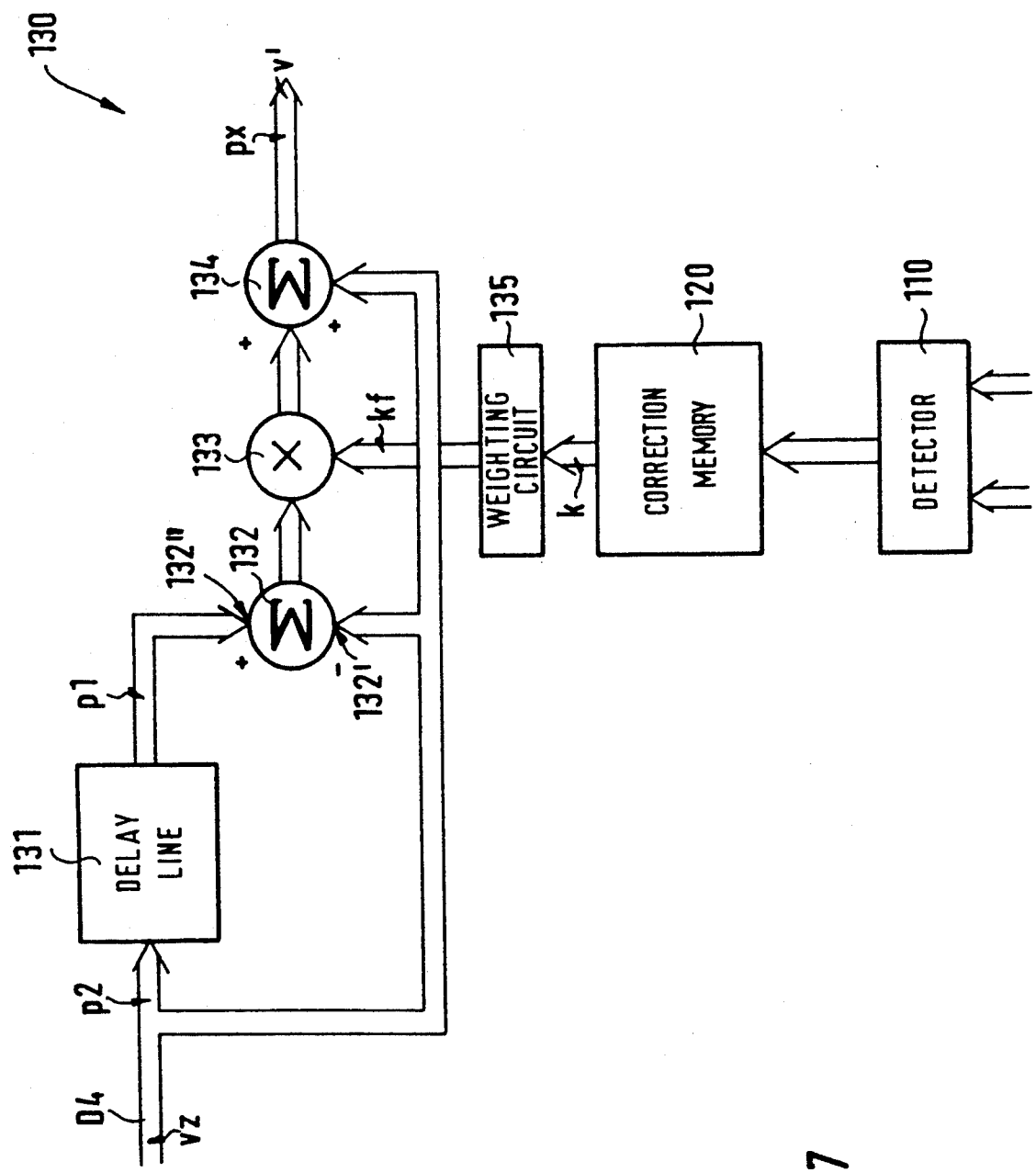
FIG. 7 is a block diagram of the correction device, which forms a part of the apparatus illustrated in FIG. 1.

Referring now to FIG. 7, there is shown a block diagram of the correction device 130, which forms a part of the apparatus illustrated in FIG. 1. The correction device 130 performs a linear interpolation (px) of the brightness values of two vertically adjacent picture elements p1 and p2 within a field in accordance with the formula $$px = p2y(1-kf) + p1ykf,$$

where kf is a correction factor that lies between 0 and 1.

The values of the current pixels p2 in the field to be corrected is transferred over the data bus vz. The current pixel value p2 is supplied to the subtrahend input (−) of the subtractor 132 via the data bus vz. The data bus vz is also coupled to an input of a delay line 131, which delays the field by one line. The output of the line delay 131, which is the value p1 of a vertically adjacent pixel, is supplied to the minuend input (+) of a subtractor 132. The output of the subtractor 132, which is a difference signal of the luminance signals of vertically adjacent pixels p1 and p2, is supplied to a first input of a multiplier 133. The correction factor kf is supplied to a second input of the multiplier 133 via a weighting circuit 135. Pixel by pixel, the multiplier 133 multiplies the difference signal by the correction factor kf. The output signal of the multiplier is supplied to a first input of an adder 134, whose second input is supplied with the value p2 of the current pixel via the bus vz. The output of the adder 134 provides the interpolated value px. For a correction factor kf=0, the input pixel p2 is not corrected such that px=p2. Thus, by line-by-line addition of the weighted difference signal from the subtractor and the input pixel value p2, signal-adaptive correction is performed in a particularly simple manner.

Figure 8:
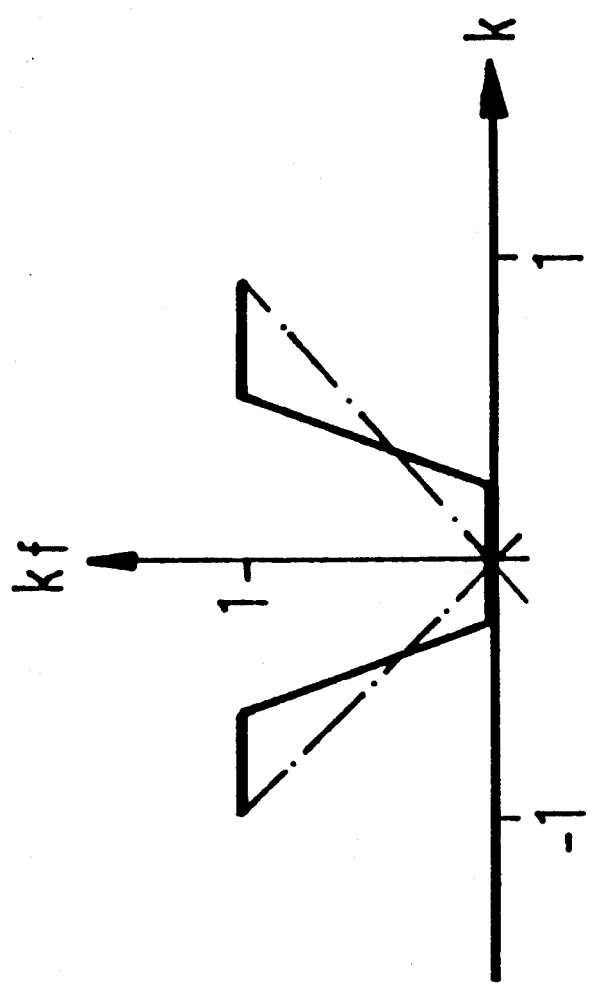
FIG. 8 is a graph of two weighting functions that can be implemented by a weighting circuit, which circuit forms a part of the correction device illustrated in FIG. 7.

Referring now to FIG. 8, there is shown a graph of two weighting functions. Either weighting function can implemented by the weighting circuit 135 to derive the correction factor kf from a weighting factor k. The non-linear weighting function illustrated by the solid lines causes the delay or acceleration of fields in which the step change occurs. For a step change having a small amplitude, no correction takes place. However, for a large amplitude, delay or acceleration of up to one line takes place. An alternate weighting function illustrated by the dash-and-dot line. In accordance with this linear function, the correction factor kf is the absolute value of the weighting factor k. The weighting functions illustrated in FIG. 8 are representative, and those skilled in the art should be readily able to adapt the correction factor kf to the specific application with the aid of a preselected correction function.

The weighting circuit 135 receives the correction values k from the correction memory 120. The correction factors (i.e., the individual values of the weighting characteristic) can be stored, for example, in read-only-memory at addresses that correspond to the correction values k. Thus, the weighting circuit 135 can be a ROM lookup table. The correction factors kf can be computed as two's complement binary numbers.

Figure 3A:
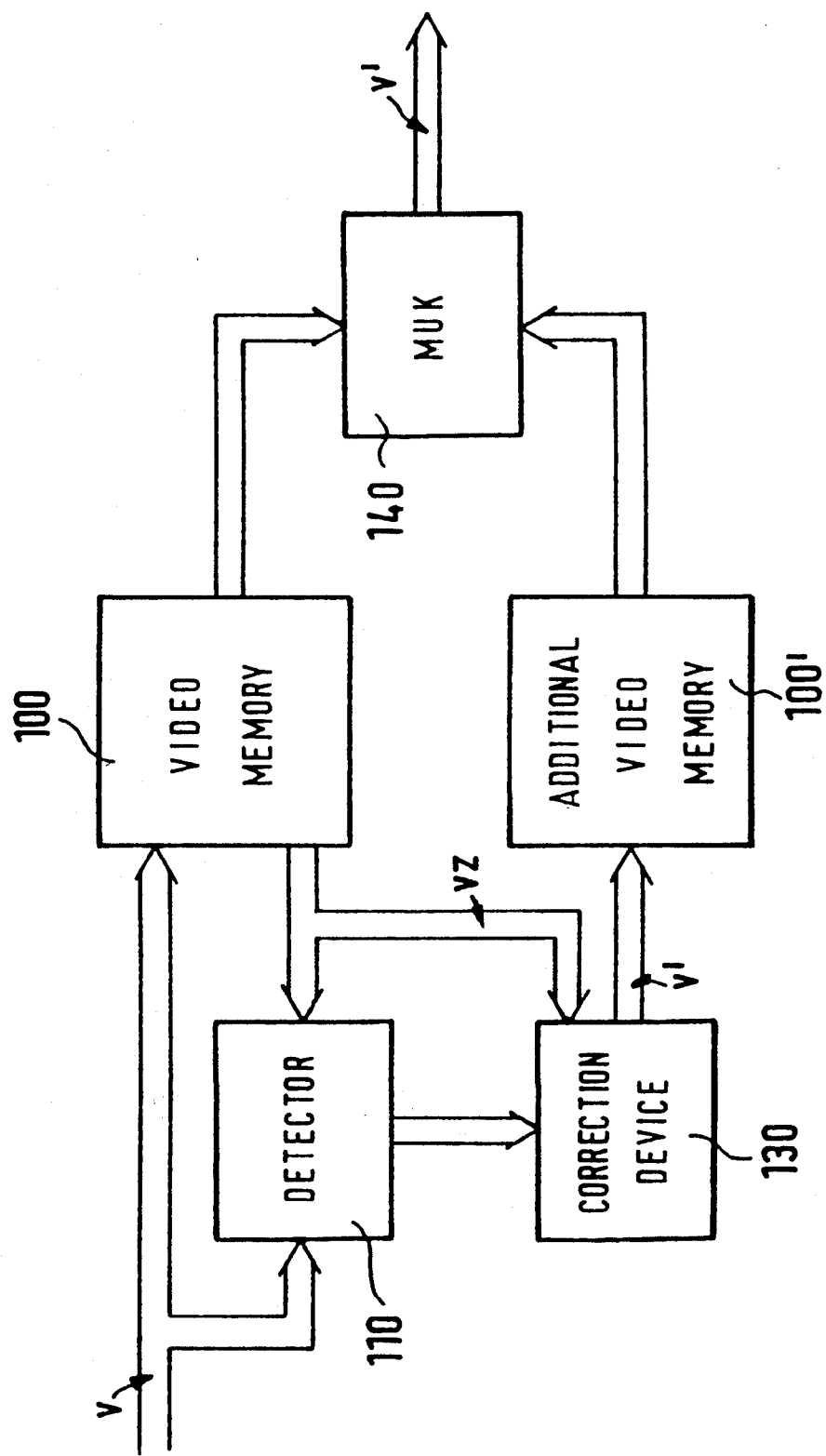
FIG. 3a is a block diagram of an apparatus for reducing flicker in accordance with an alternate embodiment of the present invention.

Referring now to FIG. 3a, there is shown an apparatus for reducing flicker in accordance with an alternate embodiment of the present invention. Besides the first video memory 100, the detector 110, and the correction device 130, the second embodiment includes an additional memory 100'. The capacity of the additional video memory 100' is chosen so that half a field can be stored in this memory. The first field A stored in the memory 100 is simultaneously applied with a delay equal to one field period to the detector 100 and the correction device 130. In the detector 110, the phase and magnitude of the step amplitude are determined line by line as described above by comparing the first field A, which was delay by one field period, with the second field B presented to the first input of the detector 110. The correction values provided by the detector 110 are processed in the correction device 130.

The essential difference between this second embodiment and the first embodiment is that the correction values are not stored in a correction-value memory 120. The correction device 130 combines the correction values directly with the first field A, which is read from the video memory 100, and corrects this field in a suitable manner. The corrected first field A is then temporarily stored in the additional video memory 100'. The picture information contained in the video memory 100 and in the additional video memory 100' is read out alternately by means of a multiplexer 140.

Referring now to FIG. 3b, there is shown the temporal sequence of the apparatus illustrated in FIG. 3a. ROW 1 shows the temporal succession of the fields 1A and 1B of the first frame which are received by the television receiver, and the corresponding first and second fields 2A, 2B, 3A, 3B, etc., of the second and subsequent frames. ROW 2 shows the signal sequence of the first and second fields applied to the detector 110, which was delayed by one field period in the video memory 100. ROW 3 shows the picture information contained in the additional video memory 100'. ROWS 4 and 5 show the alternate readout of the signal-adaptively delayed or signal-adaptively accelerated fields from the video memory 100 (ROW 4) and from the additional video memory 100' (ROW 5).

Figure 4A:
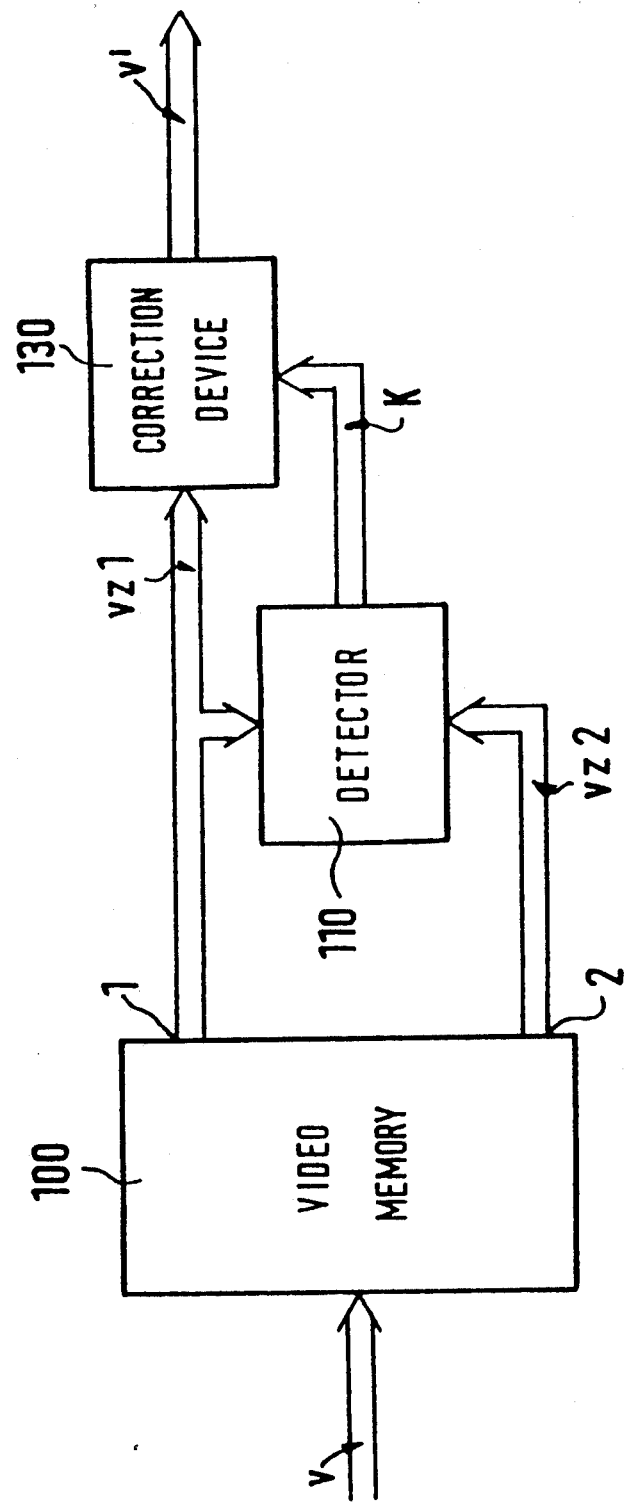
FIG. 4a is a block diagram of an apparatus for reducing flicker in accordance with yet another embodiment of the present invention.

Referring now to FIG. 4a, there is shown an apparatus for reducing flicker in accordance with yet another embodiment of the present invention. This embodiment includes a video memory 100 that can store two complete fields. The fields A and B stored in the video memory 100 are read out simultaneously via the outputs 1, 2 at a rate of 100 Hz and are fed to the detector 110. The detector 110 calculates the step amplitudes as described by the line-by-line comparison of the first field A and the second field B (vz1 and vz2, respectively) and transfers the resulting correction values K to the correction device 130. The correction device 130 corrects the field vz1 from the first output 1 as explained above. This embodiment has the advantage that the corrections values k or the corrected field v' need not be temporarily stored. The field vz2 read from the video memory 100 is written on the screen immediately after the signal-adaptive correction in the correction device 130.

Figure 4B:
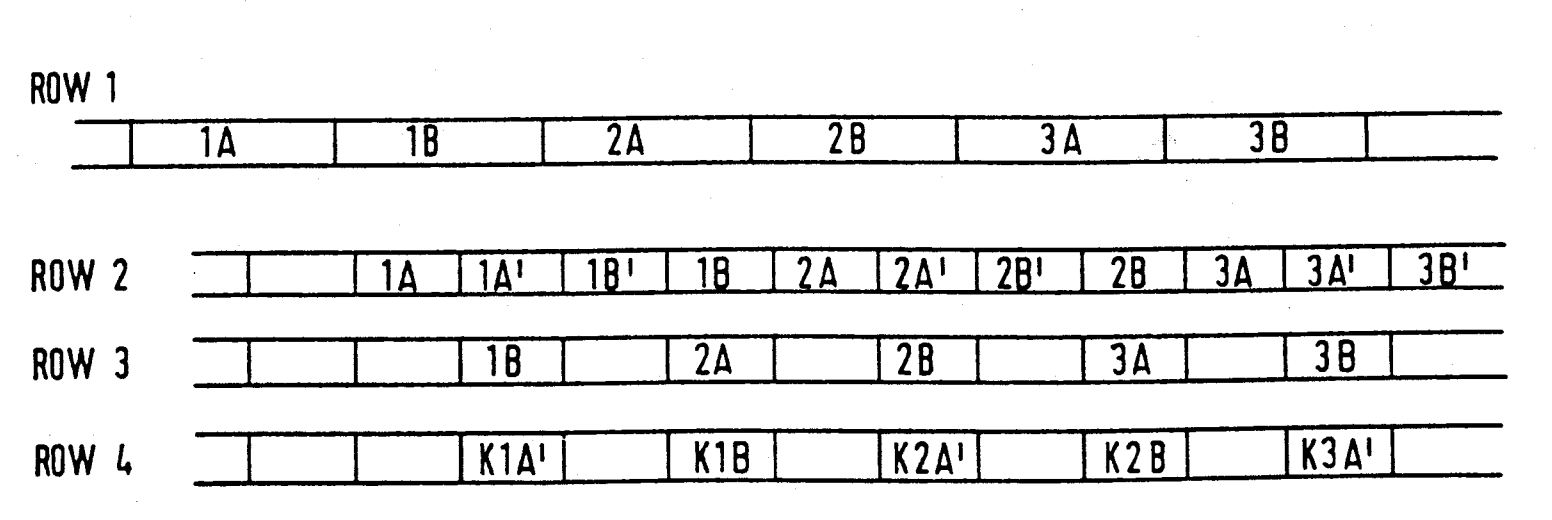

Referring now to FIG. 4b, there is shown the temporal sequence of the apparatus illustrated in FIG. 4a. ROW 1 shows the temporal succession of the incoming fields 1A, 1B, 2A, 2B, etc. ROWS 2 and 3 show the temporal sequences in which the corresponding fields are read from the video memory 100. ROW 4 shows which of the fields from the first output 1 is corrected.

Figure 6:
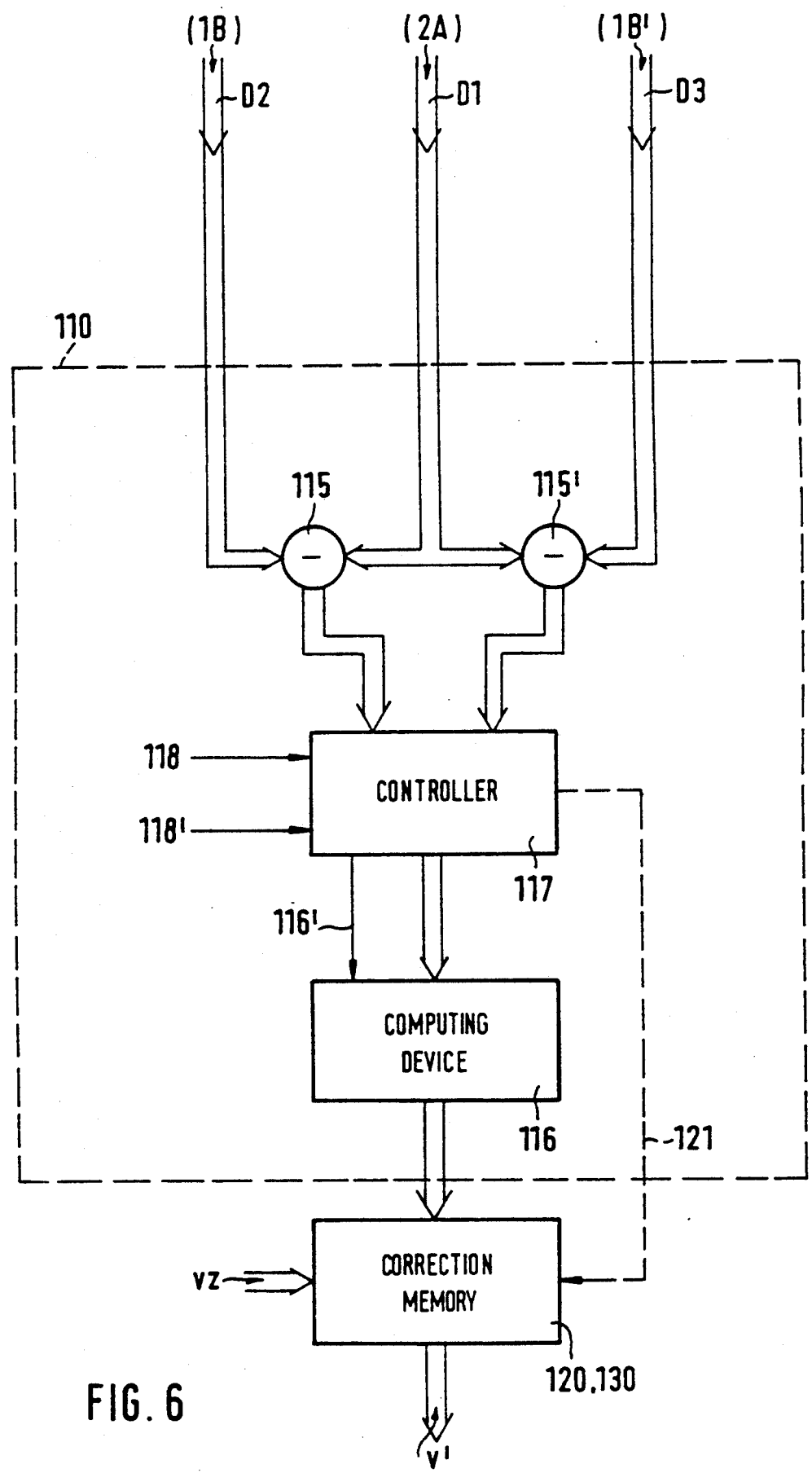

Referring now to FIG. 6, there is shown an alternate embodiment of a detector 110, which is especially suited for use in the apparatus illustrated in FIG. 4a. Elements of the detector illustrated in FIG. 6 that correspond to those elements of the detector illustrated in FIG. 5 are designated by like reference numerals. These elements are also assumed to operate in the same manner, unless stated otherwise. The essential difference between the embodiment of the detector 110 illustrated in FIG. 6 and the previously described first embodiment consists in the fact that over the data buses D1, D2, D3, the detector 110 is fed simultaneously with the current field, another field delayed by 313 lines (i.e., by one field period), and a third field delayed by 625 lines (i.e., by one frame period). These delay times relate to the fields read out at a rate of 100 Hz, and not to the fields applied to the input of the video memory 100 at a rate of 50 Hz.

The operation of the detector 110 is as follows. The field read from the video memory 100, which is to be written on the screen, e.g., the primary first field 2A (of the second frame), is fed to the detector 110 over the data bus D1. Consequently, the primary second field 1B (of the first frame) is applied over the data bus D2, and the secondary second field 1B' (of the first frame) over the data bus D3. Based on the information supplied from the central control unit of the television receiver of the signal lines 118 and 118', the controller 117 of the detector 110 determines which of the three fields presented to the detector 110 have to be compared. In the above case, line flicker detection is performed by comparing the fields 2A and 1B applied to the detector 110 over the data buses D1 and D2, respectively. Consequently, the difference signal formed from the luminance signals in the first additional subtractor 115 is routed via an electronic data switch included in the controller 117 to the computing device 116. The inverted or non-inverted correction values computed in the computing device 116 are fed to a correction memory 120 or directly to the correction device 130.

In the next step, the secondary first field 2A' (of the second frame), the primary first field 2A (of the second frame) and the secondary second field 1B (of the first frame) are applied to the detector 110 over the data buses D1, D2, and D3. Since the primary first field 2A and the secondary first field 2A' contain identical picture information, edge-flicker detection must in this case be performed by comparing the fields 2A' and 1B, which are applied to the data buses D1 and D3, respectively. The controller 117 then transfers to the computer 116 only difference signal of the secondary first field 2A' and the primary second field 1B, which signal was derived in the second additional subtractor 115'. The further steps in the detection of line flicker in the following fields are apparent from the foregoing.

Thus disclosed is a method and apparatus for reducing line flicker in a television picture. In accordance with the present invention, line flicker is detected by comparing vertically successive lines of two temporally successive fields, and line flicker is corrected by adaptively delaying or accelerating corresponding lines within the same field. This method allows for line flicker detection in a simple manner since a motion detector is not required. And, since the lines of a single field are corrected on a signal-adaptive basis, no motion blur appears. Consequently, the vertical resolution is not degraded.

It will be understood that the embodiments described herein are merely exemplary and that a person skilled in the art may make many variations and modifications without departing from the spirit and scope of the invention. All such modifications are intended to be included within the scope of the invention as defined in the appended claims.

I claim:

1. A method of reducing line flicker in a television picture reproduced from a plurality of frames supplied by an interlaced video signal, each frame in said video signal consisting of a first field, which contains all odd-numbered lines of said frame, and a second field, which contains all even-numbered lines of said frame, each one of said lines containing luminance values, said first and second fields being transmitted via said video signal at a given repetition rate, said first and second fields being reproduced on a television screen at twice the given repetition rate in a vertically-temporal scanning sequence consisting of a primary first field, secondary first field, secondary second field and primary second field, said method comprising the steps of:
   (a) determining whether a step change in luminance value occurs between a line of a field and a vertically-following line in a temporally-following field;
   (b) converting said step change to a correction factor; and
   (c) applying said correction factor to said video signal when one of said fields in said scanning sequence is reproduced, wherein a line of either said first field or said second field is signal-adaptively corrected in said one of said fields, whereby if a step change occurs in a line of said first field, said correction factor is applied to said line to cause a signal-adaptive delay of said line during the reproduction of said first field as said secondary first field and said line flicker in said picture is reduced.

2. A method according to claim 1, wherein a step change occurs in a line of said first field, and wherein said correction factor is applied to said line to cause a signal-adaptive delay of said line during the reproduction of said first field as said secondary first field.

3. A method according to claim 2, wherein a step change occurs in a line of said first field, and wherein said correction factor is applied to a corresponding line of said second field, which temporally-precedes said first field, to cause a signal-adaptive acceleration of said corresponding line during reproduction of said second field as said secondary second field.

4. A method according to claim 1, wherein a step change occurs in a line of said second field, and wherein said correction factor is applied to said line to cause a signal-adaptive delay of said line during the reproduction of said second field as said primary second field.

5. A method according to claim 2, wherein a step change occurs in a line of said second field, and wherein said correction factor is applied to a corresponding line of said first field, which temporally-precedes said second field, to cause a signal-adaptive acceleration of said corresponding line during reproduction of said first field as said secondary first field.

6. A method according to claim 1, wherein said step of determining whether said step change occurs includes the steps of differentiating the luminance values of each line, taking the difference of said differentiated values of said lines, and providing an output signal, which corresponds to the difference in differentiated values, and wherein said correction value is formed from said output signal.

7. A method according to claim 6, wherein said correction value is selected such that said video signal is not corrected when said output signal has a small value, and wherein said correction value is selected such that said video signal is corrected by one line period when said output signal has a large value.

8. Apparatus for reducing line flicker in a television picture reproduced from a plurality of frames supplied by an interlaced video signal, each frame in said video signal consisting of a first field, which contains all odd-numbered lines of said frame, and a second field, which contains all even-numbered lines of said frame, each one of said lines containing luminance values, said first and second fields being transmitted via said video signal at a given repetition rate, said first and second fields being reproduced on a television screen at twice the given repetition rate in a vertically-temporal scanning sequence consisting of a primary first field, secondary first field, secondary second field and primary second field, said apparatus comprising:

determining means for determining whether a step change in luminance value occurs between a line of a field and a vertically-following line in a temporally-following field;

converting means for converting said step change to a correction factor; and correction means for applying said correction factor to said video signal when one of said fields in said scanning sequence is reproduced, wherein a line of either said first field or said second field is signal-adaptively corrected in said one of said fields, whereby if a step change occurs in a line of said first field, said correction factor is applied to said line to cause a signal-adaptive delay of said line during the reproduction of said first field as said secondary first field and said line flicker in said picture is reduced.

9. Apparatus according to claim 8, wherein said determining means includes:

a video memory having an input supplied with said video signal and a first output that provides a video signal that is delayed by one field; and a detector having a first input coupled to said first output of said video memory and a second input supplied with said video signal and providing a difference signal from the difference in luminance values of vertically-successive lines of temporally-successive fields, which values are provided on said first and second inputs of said detector, said difference signal being provided on an output of said detector.

10. Apparatus according to claim 9, wherein said video memory has a storage capacity that can hold at least one of said fields of said video signal.

11. Apparatus according to claim 9, wherein said converting means includes a lookup table having an input coupled to said output of said detector, said lookup table storing said correction values and providing one of said correction values on an output thereof in response to said difference signal provided by said detector.

12. Apparatus according to claim 11, wherein said lookup table and said video memory are provided on a single random access memory device.

13. Apparatus according to claim 12, wherein said video memory provides a video signal delayed by one field in said vertically-temporal scanning sequence on a second output, and wherein said correction means includes a correction device having a first input coupled to said second output of said video memory and a second input coupled to an output of said lookup tale, said correction device signal-adaptively correction said field provided by said video memory and providing said adaptively-corrected signal on an output to be reproduced on said screen.

14. Apparatus according to claim 13, wherein said correction means further includes a variable delay line interposed between said correction device and said video memory, said delay line having an input connected to said second input of said video memory and an output connected to said first input of said correction device, said delay line being controlled by said correction means.

15. A detector according to claim 9, wherein the luminance signals of corresponding lines of the fields to be compared are passed through first and second differentiators, respectively, that from the luminance signal thus differentiated, an additional subtractor forms said difference signal.

16. A detector according to claim 9, wherein said sequence is applied over a first data bus (D1) to a first additional subtractor and a second additional subtracter, that said temporally-preceding field is applied over a second data bus to said first additional subtractor, that said temporally-preceding field is applied over a third data bus to said second additional subtracter, that the outputs of the first and second additional subtracters are connected to a controller, that the controller connects the outputs of the first additional subtracter and the second additional subtracter alternately to a computing device, and that the controller is fed over first and second signal lines with information from a central control unit of the television on the fields presented to the inputs of the detector.

17. A correction device according to claim 14 wherein said field to be corrected is applied over a data bus to a delay element providing a delay equal to one line period, to a subtrahend input of a subtracter, and to a summer, that the output of the delay element is connected to aminuend input of the subtracter, that the difference signal formed in the subtracter is fed to a multiplier which multiplies it by a correction factor from a weighting circuit and that the output of the multiplier is fed to the summer.

18. An arrangement according to claim 14, wherein said correction values are formed by the detector and are fed directly to the correction device that the field signal-adaptively corrected in the correction device is temporarily stored in an additional video memory, and that a multiplexer is provided which alternately reads the contents of the video memory and the additional video memory.

* * * * *